May 6, 1941.  C. E. ETCHEMENDY  2,241,012
VALVE
Filed July 26, 1939
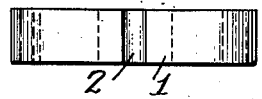
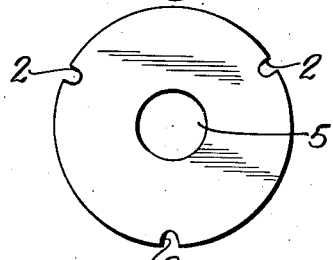
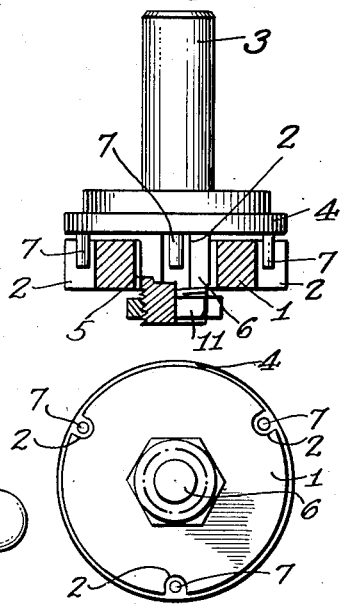
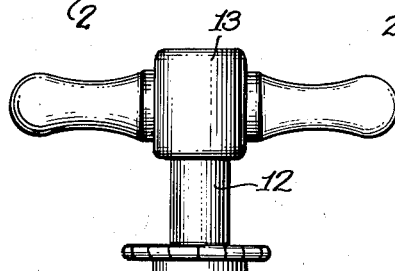
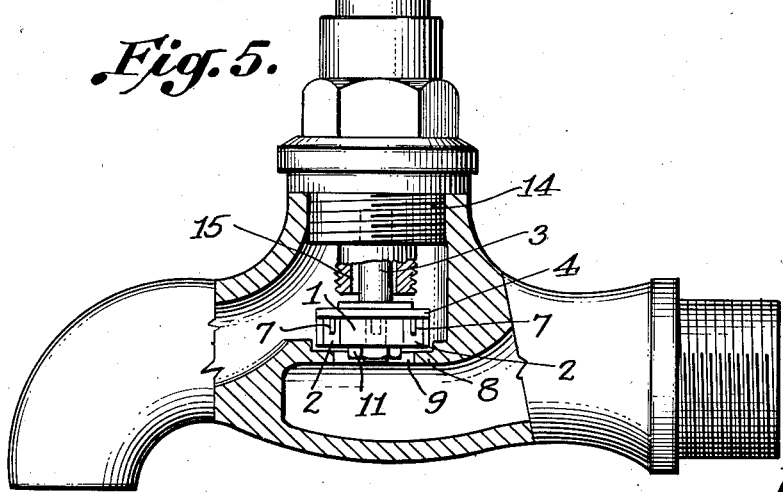
Inventor:
CARLOS ENRIQUE ETCHEMENDY
BY
Richards & Geier
ATTORNEYS Patented May 6, 1941

2,241,012

UNITED STATES PATENT OFFICE 2,241,012

VALVE

Carlos Enrique Etchemendy, Buenos Aires, Argentina

Application July 26, 1939, Serial No. 286,609
In Argentina February 10, 1939

4 Claims. (Cl. 251—44)

This invention relates to a valve structure and the like and more particularly to a valve structure of the general type in which a rotatable valve stem has such operative engagement with the valve member that the rotation of the stem causes a straight-line movement of the valve member during the valve closing operation.

The present object of the invention is to provide clutch means between the valve stem and the valve member, so that once the latter has settled firmly in the valve seat, the clutch means will become disengaged and further actuation of the stem will be ineffectual upon the valve member. In this manner, wear and tear caused by the valve member being dragged around the valve seat by the rotatable movement of the valve stem will be eliminated.

Another object is to provide an improved assembly of the parts so that they can be easily disassembled and the parts repaired or replaced.

Other objects and advantages inherent in the invention will become apparent from the following detailed description taken in conjunction with the accompanying drawing which illustrates, by way of example, an embodiment of the invention.

Figure 1 is a side elevation of a valve member according to the invention.

Figure 2 is a top plan view of the valve element shown in Figure 1.

Figure 3 is a side elevation of the valve element in assembled condition.

Figure 4 is a bottom plan view of the device shown in Figure 2.

Figure 5 is a side elevation, with portions broken away, of a water faucet showing an installation of the improved valve structure.

In said views the same reference numbers indicate analogous or corresponding parts.

The objects of the invention may be carried out by providing notches, or similar means, in the valve member which are normally engaged in projections or lugs on the valve stem and arranged in such a manner that they may easily become disengaged from the notches when the forces acting on the valve member and the stem in opposite directions exceed a predetermined maximum.

In terms of broad inclusion, therefore, the invention contemplates clutch means which normally maintain the valve member and the valve stem in operative engagement and which clutch means become disengaged automatically from the valve member when forces acting in opposite directions on said members exceed a predetermined maximum.

Referring in greater detail to the drawing, the valve body comprises a disc therefor 1, of flexible material, provided with a plurality of peripheral notches 2.

Referring to Fig. 2, the means which supports the valve member comprises a stem 3 which normally projects from the superior face of disc 4. The valve disc 1, is provided with a central aperture 5, in which a stem 6 which normally projects from the inferior face of disc 4 is accommodated. The disc 4 is also provided with a plurality of peripheral lugs 7 which engage freely notches 2 of disc 1. These notches, in conjunction with the lugs, form a clutch mechanism which is controlled by the friction of the disc 1 against seat 8 which defines the discharge orifice 9 of stopcock 10, Fig. 3.

The lower end of stem 6, is threaded for receiving a retention nut 11. Instead of a retention nut, the end of the stem may be formed with a protuberance over which the aperture 5 may be forced. The disc 1 is preferably made of some resilient material such as rubber or the like.

The operation of the invention is as follows: When the handle 13 is turned, the spindle 12 engaging the screw-threaded guide coupling 14 will move towards the valve seat 8. This operation will press downward the stem 3 through the spacing nut 15 as well as the discs 1 and 4 until the disc 1 is firmly seated in the valve seat 8. Further downward pressure upon the discs 1 and 4 will result in the lugs 7 slipping out of notches 2 and continued turning of the handle will simply rotate the lugs about the disc 1. It will be easily understood that the life of the valve disc according to the invention has thus been increased considerably.

It is also to be understood that upon rotation of the spindle 12 and the valve stem 6 in the reverse direction so as to permit opening of the valve, the force of the water supply through the aperture 5 will cause the valve member to rise and to follow the upward movement of the valve stem.

Having thus discribed the invention and the manner of carrying it into effect, what is claimed as the exclusive right and property of the inventor, is:

1. In a valve structure, a valve member, a rotatable valve stem for moving said valve member in a straight line, clutch means normally maintaining said valve member and said valve stem in operative engagement, said clutch means becoming disengaged when forces acting in opposite directions on said valve member and said valve stem exceed a predetermined maximum, said clutch means comprising a plurality of peripheral notches in said valve member and lugs in said valve stem engaging said notches.

2. In a valve structure, a valve disc of resilient material, a plurality of peripheral notches in said valve disc, a rotatable valve stem for moving said valve disc in a straight line, a plurality of lugs on said valve stem normally engaging said notches.

3. In a valve structure, an apertured valve disc of resilient material, a plurality of peripheral notches in said valve disc, a rotatable valve stem rotatably and reciprocably engaging said apertured valve disc for moving said valve disc in a straight line, a stem disc on said valve stem, and lugs on said stem disc normally engaging the peripheral notches of said valve disc.

4. In a valve structure, an apertured valve disc of resilient material, a plurality of peripheral notches in said valve disc, a rotatable valve stem rotatably and reciprocably engaging said apertured valve disc for moving said valve disc in a straight line, a stem disc on said valve stem, lugs on said stem disc normally engaging the peripheral notches of said valve disc, and means for limiting the reciprocatory movement of said valve stem with respect to said valve disc.

CARLOS ENRIQUE ETCHEMENDY.